(12) United States Patent
Albright

(10) Patent No.: US 10,501,024 B1
(45) Date of Patent: Dec. 10, 2019

(54) COMMUNICATION DEVICE WEATHER SHIELD AND VEHICLE DOOR MOUNT APPARATUS

(71) Applicant: Alexander J. Albright, Grants Pass, OR (US)

(72) Inventor: Alexander J. Albright, Grants Pass, OR (US)

( * ) Notice: Subject to any disclaimer, the term of this patent is extended or adjusted under 35 U.S.C. 154(b) by 0 days.

(21) Appl. No.: 15/874,043

(22) Filed: Jan. 18, 2018

Related U.S. Application Data

(60) Provisional application No. 62/598,098, filed on Dec. 13, 2017.

(51) Int. Cl.
| | |
|---|---|
| *B60R 11/00* | (2006.01) |
| *B60R 11/02* | (2006.01) |
| *A45C 11/00* | (2006.01) |
| *G06F 1/16* | (2006.01) |
| *B60R 9/02* | (2006.01) |

(52) U.S. Cl.
CPC .............. *B60R 11/02* (2013.01); *A45C 11/00* (2013.01); *B60R 9/02* (2013.01); *G06F 1/163* (2013.01); *A45C 2011/001* (2013.01); *A45C 2011/002* (2013.01); *A45C 2011/003* (2013.01); *B60R 11/0211* (2013.01); *B60R 11/0229* (2013.01); *B60R 11/0241* (2013.01); *B60R 11/0252* (2013.01); *B60R 11/0258* (2013.01); *B60R 2011/004* (2013.01); *B60R 2011/0294* (2013.01)

(58) Field of Classification Search
CPC . B60R 11/02; B60R 9/02; A45C 11/00; G06F 1/163
USPC .......................................................... 224/482
See application file for complete search history.

(56) References Cited

U.S. PATENT DOCUMENTS

| | | | | |
|---|---|---|---|---|
| 1,133,979 | A | * | 3/1915 | Lee ........................... B42F 7/14 |
| | | | | 312/190 |
| 1,642,385 | A | | 8/1926 | Pryor |
| 1,967,632 | A | | 5/1932 | Simonson |
| 2,547,167 | A | * | 4/1951 | Nielsen ................... B43L 3/007 |
| | | | | 24/DIG. 8 |
| 4,445,728 | A | * | 5/1984 | Bratton ................... B43L 3/007 |
| | | | | 108/23 |
| 4,997,088 | A | * | 3/1991 | Spry ...................... B42D 5/006 |
| | | | | 206/449 |
| 5,474,333 | A | * | 12/1995 | Schrader ................ B42D 3/045 |
| | | | | 281/45 |

(Continued)

*Primary Examiner* — Peter N Helvey
(74) *Attorney, Agent, or Firm* — Jerry Haynes Law

(57) ABSTRACT

A communication device weather shield and vehicle door mount apparatus protects a communication device from moisture and debris while being operated by a user, and mounts the communication device to a vehicle door panel, so as to be operable from directly on the vehicle. The apparatus provides an anchor panel that mounts the communication device with an anchoring mechanism, and enables manipulation of the communication device with a hand grip. The apparatus provides a protective transparent shield that is fixedly disposed in a parallel, spaced-apart relationship with the anchor panel. The shield is larger than the anchor panel, covering the anchor panel to protect the communication device from moisture and debris. The transparent shield is sized to slide in a recess between a vehicle side inner window surface and a side inner door so that the communication device hangs on the side of the vehicle below the window.

9 Claims, 5 Drawing Sheets

(56) References Cited

U.S. PATENT DOCUMENTS

| | | | |
|---|---|---|---|
| 5,590,910 A * | 1/1997 | Meth | B42F 9/002 |
| | | | 281/45 |
| 6,084,711 A | 7/2000 | Duff | |
| 6,115,238 A | 9/2000 | Von Gutfeld | |
| 6,646,866 B2 | 11/2003 | Kao | |
| 6,734,842 B2 | 5/2004 | Woodmansee et al. | |
| D514,582 S | 2/2006 | Dulberger | |
| D530,719 S | 10/2006 | Roubanis | |
| D552,616 S | 10/2007 | Woolley et al. | |
| 7,304,839 B1 | 12/2007 | Burns | |
| 7,374,143 B1 | 5/2008 | Wittke | |
| 7,907,394 B2 | 3/2011 | Richardson et al. | |
| 8,657,248 B2 | 2/2014 | Rowzee et al. | |
| 8,717,451 B2 | 5/2014 | Marker | |
| 8,792,232 B2 | 7/2014 | Richardson | |
| 2002/0185395 A1 | 12/2002 | Lindamood | |
| 2016/0000210 A1 | 1/2016 | Robenalt | |

* cited by examiner

COMMUNICATION DEVICE WEATHER SHIELD AND VEHICLE DOOR MOUNT APPARATUS

CROSS-REFERENCES TO RELATED APPLICATIONS

This application claims priority from U.S. Provisional Application Ser. No. 62/598,098, entitled "Communication Device Weather Shield and Vehicle Door Mount Apparatus", filed on Dec. 13, 2017, which application is hereby incorporated herein by reference in its entirety.

FIELD OF THE INVENTION

The present invention relates generally to a communication device protective shield. More so, the present invention relates to a weather shield and vehicle door mount apparatus that protects a communication device from moisture and debris while being operated by a user, and mounts the communication device to a vehicle door panel, so as to be operable from directly on the vehicle.

BACKGROUND OF THE INVENTION

Several efforts have been done to use clipboards at outdoors or at environment comprising extreme atmospheric conditions so as to allow use the clipboards at inclement weather conditions comprising heavy wind, wet conditions, or extreme light conditions or dust or debris or a combination thereof. But now computers, portable electronic and communication devices have become a part of our everyday lives. The declining use of paper has led to an increased need for ready access to a computing device as a source of information. A constant internet connection has become commonplace, accompanied by the expectation of rapid communication and constant availability.

Portable electronic devices (PEDs), such as, tablets, iPads, PDAs, computers, MP3 players, music players, video players, smart phones, GPS receivers, telematics devices, cell phones, satellite phones, pagers, monitors, etc., are being very widely used, and are being deployed in severe hazardous environments including industrial environments, public places and outdoors allowing the PEDs to be exposed to direct sunlight, wind-blown debris, air-born dust, water, snow, moisture, heat and other effects of extreme weather conditions.

But the use of these PEDs while standing is awkward. While a tablet can be held in one hand and operated using the other, tablets commonly weigh one and one-half pounds or more. Over time such use becomes tiring. Additionally, operating these devices at extreme weather conditions is difficult as well as unsafe for the PEDs.

For example, In-N-Out Burger® takes orders outside with tablets to ensure their customer gets served quickly. They do not take orders outside when it is raining or snowing because they do not want to get their devices wet. Similar to In-N-Out Burger®, Dutch Bros Coffee® uses tablets to take orders outside in all elements. They tend to have issues when it rains though. Similar to "In-N-Out", they take orders outside, yet only when there is no precipitation. Further in another example, the National Football League and many other sports organizations use tablets to track many things while outdoors.

Numerous innovations have been provided in prior art that are adapted to protective apparatus and weather shields for clipboards and electronic devices. Even though these innovations may be suitable for the specific purposes to which they address, however, they would not be as suitable for the purposes of the present invention.

For example, U.S. Pat. No. 1,642,385 to Pryor and U.S. Pat. No. 1,967,632 to Simonson disclose apparatuses for supporting and shielding writing boards or pads. The shield is provided with transparent panes and has sufficient space that the hand may be inserted through the apparatus when it is desired to write upon the pad while protecting the pad from rain.

U.S. Pat. No. 4,445,728 to Bratton teaches an all-weather clipboard assembly comprising a clipboard surrounded by a clear plastic housing. The assembly further allows the user to access the interior of the housing so that the writing materials can be inserted and removed from the clipboard. Further the assembly has provisions for illuminating the clipboard for use at night.

U.S. Pat. No. 4,997,088 to Spry describes a protective cover for a clip board which permits use of the clip board for writing during inclement weather. The cover is transparent and attaches to the side edges and rear edge of the clip board to form a box-like structure over the clip board leaving an opening at the front for access to the writing surface of the clip board. Further this protective cover is collapsible and portable yet can be quickly assembled and attached to a clip board in case of bad weather out in the field.

U.S. Pat. No. 5,474,333 to Schrader discloses a weatherproof clipboard assembly wherein a housing has a transparent lid and an interior cavity permits the lid to be hingedly mounted to the housing permitting selective securement of a clipboard within the housing, permitting access interiorly of the housing for writing upon a clipboard selectively secured to the housing floor.

U.S. Pat. No. 5,590,910 to Meth teaches an all-weather clipboard assembly having a five-sided protective cover configuration for protecting writing media held by the board's clip, and a compact and generally planar collapsed configuration for use during good weather and indoors, and also for storage.

U.S. Pat. No. 6,084,711 to Duff describes a foldable laptop computer shade, which is a four sided collapsing box, which when expanded and placed directly over the entire computer, effectively shields the display from outside light sources enough to provide comfortable viewing possible so as to reduce the amount of ambient light adversely affecting the view ability of portable laptop/notebook computers.

U.S. Pat. No. 6,115,238 to Von Gutfeld discloses an apparatus includes a housing having plurality retractable flaps for housing an LCD display of an electronic device. The retractable flaps are for limited a viewing angle of the LCD when the flaps are moved from a first position to a second position.

U.S. Pat. No. 6,646,866 to Kao teaches a protective case to store a tablet PC. The case has an access opening for inserting and taking out the tablet PC, and a display opening for exposing the touch display panel of the tablet PC.

U.S. Pat. No. 7,304,839 to Burns describes a laptop computer outdoor protector for protecting a laptop computer during outdoor operation with the monitor disposed vertically to reduce glare from sunlight or other high intensity ambient light and to protect the laptop computer from wind, rain, snow or other objects such as tennis balls or golf balls. The protector may also be folded and stored while not in use.

U.S. Design Pat. No. D514582 to Dulberger illustrates an ornamental design for a universal hood and kit for laptop computer LCD screen.

U.S. Design Pat. No. D530719 to Roubanis illustrates an ornamental design for an electronic equipment enclosure.

U.S. Design Pat. No. D552616 to Woolley et al. illustrates an ornamental design for a table-top box for touch screen and LCD keypad.

U.S. Pat. No. 7,374,143 to Wittke describes an all-weather clipboard cover comprising a transparent dome enclosing the clipboard with an opening, battery powered LED's illuminating the clipboard, a track around the sides and closure end of the cover providing slideably removable attachment to the clipboard.

U.S. Pat. No. 7,907,394 to Richardson et al. discloses a protective enclosure for a personal electronic device. The shell is substantially watertight, substantially rigid and substantially crush-resistant. The enclosure has a transparent protective membrane positioned over the touch screen of the electronic device when the electronic device is enclosed in the shell.

U.S. Pat. No. 8,657,248 to Rowzee et al. teaches a supporting apparatus for a thin electronic product comprising a main body having a chamber, a locating portion located on the external lateral surface of the chamber. The thin electronic product can be visibly fastened to the external lateral surface by the locating portion.

U.S. Pat. No. 8,792,232 to Richardson describes a chemically resistant protective cover for an electronic device that has an interactive control panel includes a protective shell. An aperture defined by the protective shell aligns with the interactive control panel. A chemically resistant protective membrane has a combination of sufficient thinness and a dielectric constant that together permit capacitive input on a front side of the protective membrane to be transmitted to the capacitance sensing interactive control panel.

U.S. Pat. Application No. 20020185395 to Lindamood discloses a collapsible electronic equipment enclosure to enclose portable or tabletop electronic equipment comprising opaque protective sheeting supported by flexible struts, a transparent window and a provision for hand entry to permit use of the contained equipment while it is protected from environmental hazards. The enclosure collapses to store in a narrow space.

U.S. Pat. Application No. 20160000210 to Robenalt teaches a wearable tablet sling for use with a tablet computer comprising internal support structure for support of a tablet computer. The combination of a tablet platform and stop-hinge type hinge allows a user to easily access a tablet in standing position without the encumbrance of straps.

It is apparent now that numerous innovations for providing a weather shield or protecting the clipboards or electronic devices from extreme weather conditions when they are used at outdoor have been developed in the prior art that are adequate for various purposes. Furthermore, even though these innovations may be suitable for the specific purposes to which they address, accordingly, they would not be suitable for the purposes of the present invention as heretofore described. Thus a weather shield apparatus for communication device that can be mounted on to vehicle door for facilitating use of the communication device efficiently while protecting the communication device from extreme weather conditions is needed.

SUMMARY OF THE INVENTION

The present invention relates generally to a communication device weather shield and vehicle door mount apparatus. More so, the present invention relates to a weather shield and vehicle door mount apparatus that protects a communication device from moisture and debris while being operated by a user, and mounts the communication device to a vehicle door panel, so as to be operable from directly on the vehicle; whereby the apparatus provides an anchor panel that mounts the communication device with an anchoring mechanism, and enables manipulation of the communication device with a hand grip; whereby the apparatus provides a protective transparent shield that is fixedly disposed in a parallel, spaced-apart relationship with the anchor panel to protect the communication device from moisture and debris; and whereby the transparent shield is sized and dimensioned to slide in a recess between a vehicle side inner window surface and a vehicle side inner door so that the communication device hangs on the side of the vehicle below the window, and is thereby operable directly from the vehicle.

According to one aspect of the present invention a communication device protective shield apparatus, wherein the apparatus comprising an elongated anchor panel defined by a panel first side, a panel second side, and a panel edge, the panel first side comprising an anchoring mechanism operable to detachably mount a communication device, the anchoring mechanism further comprising a hand grip operable to enable manipulation of the apparatus; a transparent shield defined by a shield first side, a shield second side, a shield edge, and a generally flat, planar configuration, wherein the transparent shield being disposed in a parallel, spaced-apart relationship with the anchor panel, the transparent shield being dimensioned generally larger than the anchor panel, whereby the transparent shield substantially covers the anchor panel; and an elongated bridge portion connecting the edges of the anchor panel and the transparent shield to form a "U-shaped" elongated cavity, whereby the communication device is positioned in the "U-shaped" elongated cavity facing the shield first side of the transparent shield, thereby allowing user to operate the communication device while it is simultaneously being protected by the transparent shield.

According to another aspect of the present invention a communication device protective shield and vehicle door mount apparatus, the apparatus comprising an elongated anchor panel defined by a panel first side, a panel second side, and a panel edge, the panel first side comprising an anchoring mechanism operable to detachably mount a communication device along length of the panel first side, the anchoring mechanism further comprising a hand grip operable to enable manipulation of the apparatus; a transparent shield defined by a shield first side, a shield second side, a shield edge, and a generally flat, planar configuration, whereby the transparent shield is sized and dimensioned to slidably mount in a recess between a vehicle side inner window surface and a vehicle side inner door, the transparent shield being disposed in a parallel, spaced-apart relationship with the anchor panel, the transparent shield being dimensioned generally larger than the anchor panel, whereby the transparent shield substantially covers the anchor panel; and an elongated bridge portion connecting the edges of the anchor panel and the transparent shield, whereby the elongated bridge portion separates the anchor panel from the transparent shield by at least 6 inches.

In view of the foregoing, it is therefore an objective of the present invention is to provide a protective apparatus that substantially covers a communication device with a transparent shield, so as to protect the communication device from moisture, wind, debris and the like.

Another objective is to enable one-handed manipulation of the communication device while attached to the apparatus.

Another objective is to provide an apparatus having a transparent shield to provide clear view of the display screen for the communication device.

Yet another objective is to provide an apparatus that allows securely mounting the communication device to the side of a vehicle.

Yet another objective is to benefit camera users that have high quality cameras and video cameras to capture photographs and videos while mounting the apparatus to vehicle door.

Yet another objective is to provide an apparatus that acts as a weather shield; the communication device and the apparatus further allow to be mounted to a vehicle door so as to facilitate operating the communication device by one hand while protecting the device with touch screen capabilities by the weather shield.

Yet another objective is to provide an inexpensive to manufacture communication device weather shield and vehicle door mount apparatus.

Other objectives and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A communication device weather shield and vehicle door mount apparatus 100 is referenced in FIGS. 1-6. The communication device weather shield and vehicle door mount apparatus 100, hereafter "apparatus 100" is operable with a communication device 200, such as a tablet or smart phone, to protect the communication device 200 from moisture and debris while being operated; and also to enable mounting the communication device 200 to a vehicle door panel 202, so as to be mountable and operable from directly on the vehicle.

Figure 1:
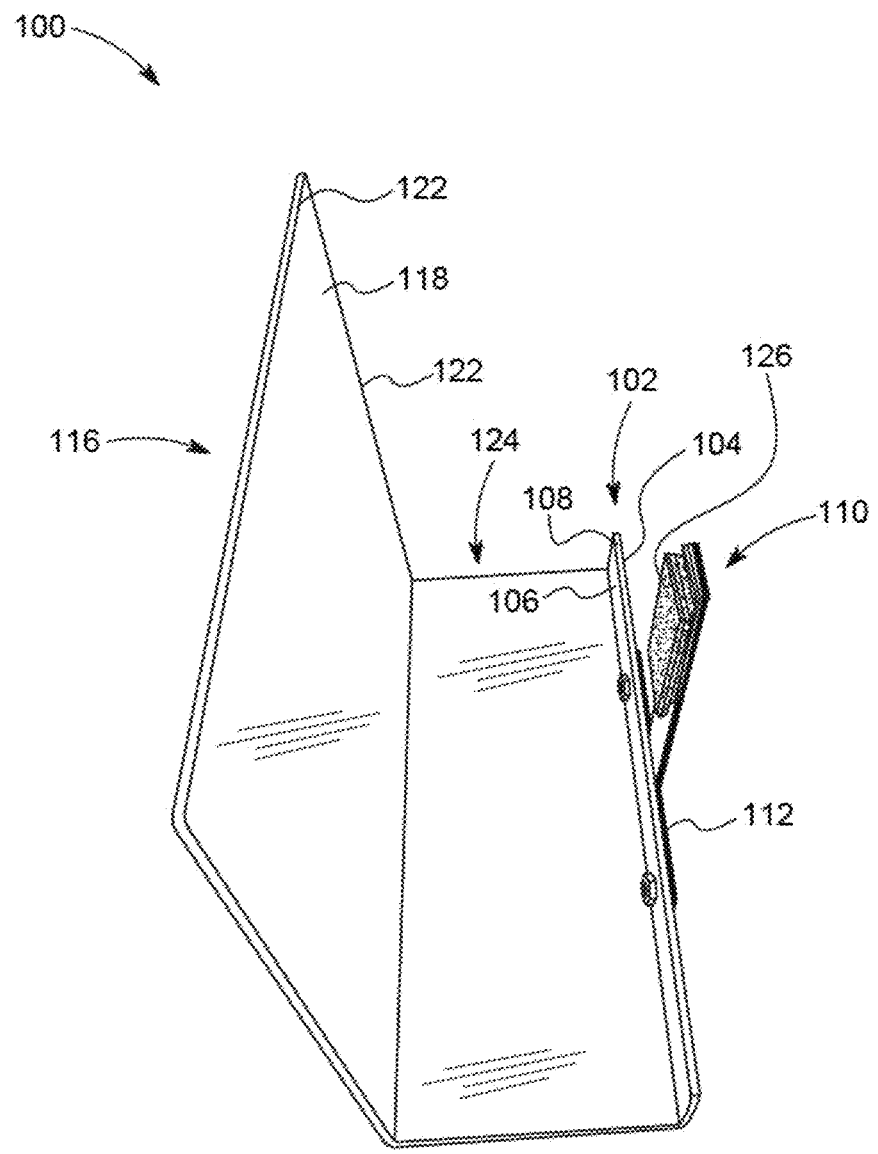
FIG. 1 illustrates a perspective view of an exemplary communication device weather shield and vehicle door mount apparatus, in accordance with an embodiment of the present invention.

As FIG. 1 references, the apparatus 100 includes an anchor panel 102, on which the communication device 200 mounts, and through which a user can manipulate the apparatus 100 and mounted communication device 200. A communication device 200 is able to mount to the anchor panel 102 through an anchoring mechanism 110. The anchoring mechanism 110 is fixedly disposed on a panel first side 104 of the anchor panel 102. A hand grip 114 detachably attaches to the panel first side 104, or in some embodiments, to the anchoring mechanism 110. The hand grip 114 is configured to enable a hand to securely grip and manipulate the apparatus and attached communication device 200.

The apparatus 100 further includes a protective transparent shield 116 that is fixedly disposed in a parallel, spaced-apart relationship with the anchor panel 102. The transparent shield 116 provides the dual function of protecting the communication device 200 from moisture and debris, and also mounting the communication device 200 to a vehicle door panel 204. The transparent shield 116 is planar, flat, and generally has larger dimensions than standard communication devices, so as to be sized and dimensioned to both cover the communication device 200, and also slide in a recess between a vehicle side inner window surface 202 and a vehicle side inner door 204; whereby the communication device 200 hangs on the side of the vehicle below the window, and is thereby operable directly from the vehicle.

According to one aspect of the present invention, a communication device protective shield apparatus 100, wherein the apparatus 100 comprising: an elongated anchor panel 102 defined by a panel first side 104, a panel second side 106, and a panel edge 108, the panel first side 104 comprising an anchoring mechanism 110 operable to detachably mount a communication device 200, the anchoring mechanism 110 further comprising a hand grip 114 operable to enable manipulation of the apparatus 100; a transparent shield 116 defined by a shield first side 118, a shield second side 120, a shield edge 122, and a generally flat, planar configuration, wherein the transparent shield 116 being disposed in a parallel, spaced-apart relationship with the anchor panel 102, the transparent shield 116 being dimensioned generally larger than the anchor panel 102, whereby the transparent shield 116 substantially covers the anchor panel 102; and an elongated bridge portion 124 connecting the edges 108 and 122 of the anchor panel and the transparent shield to form a "U-shaped" elongated cavity 130, whereby the communication device 200 is positioned in the "U-shaped" elongated cavity 130 facing the shield first side 118 of the transparent shield 116, thereby allowing a user to operate the communication device 200 while it is simultaneously being protected by the transparent shield 116.

In another aspect, the elongated bridge portion 124 separates the anchor panel 102 from the transparent shield 116 by at least 6 inches to form the "U-shaped" elongated cavity 130.

In another aspect, the communication device 200 can be rotatably mounted on the T-bar 112 of the anchoring mechanism 110, thereby allowing the transparent shield 116 to slidably mount on to a door of a vehicle 204.

According to another aspect of the present invention, a communication device protective shield and vehicle door mount apparatus 100, comprises: an elongated anchor panel 102 defined by a panel first side 104, a panel second side 106, and a panel edge 108, the panel first side 104 comprising an anchoring mechanism 110 operable to detachably mount a communication device 200 along length of the panel first side 104, the anchoring mechanism 110 further comprising a hand grip 114 operable to enable manipulation of the apparatus 100; a transparent shield 116 defined by a shield first side 118, a shield second side 120, a shield edge 122, and a generally flat, planar configuration, whereby the transparent shield 116 is sized and dimensioned to slidably mount in a recess between a vehicle side inner window surface 202 and a vehicle side inner door 204, the transparent shield 116 being disposed in a parallel, spaced-apart relationship with the anchor panel 102, the transparent shield 116 being dimensioned generally larger than the anchor panel 102, whereby the transparent shield 116 substantially covers the anchor panel 102; and an elongated bridge portion 124 connecting the edges 108, 122 of the anchor panel 102 and the transparent shield 116, whereby the elongated bridge portion 124 separates the anchor panel 102 from the transparent shield 116 by at least 6 inches.

In another aspect, the anchor panel 102 and the transparent shield 116 have a generally rectangular shape.

In another aspect, the anchoring mechanism 110 is a T-bar 112 that fastens to the panel first side 104. Further, the T-bar 112 comprises a strip of hook and loop fastener 126 material for attaching to the communication device 200, or hand grip 114, or both.

In another aspect, the hand grip 114 is a detachable grip mechanism selected from the group of a strap, or a hook and loop fastener, or a buckle, or other hand fastening means known in the art.

In another aspect, the communication device 200 includes at least one of the following: a tablet, a smart phone, a laptop, a television, personal electronic devices, personal data assistants, computers, MP3 players, music players, video players, smart phones, GPS receivers, telematic devices, cell phones, satellite phones, pagers, monitors, walkie-talkies, bar code readers, computers, and general portable electronic devices.

In another aspect, the anchor panel 102 is transparent.

In another aspect, the transparent shield 116 helps to protect the communication devices 200 with touch screen capabilities.

In another aspect, the hand grip 114 is attached to a back cover 128 of the communication device 200.

One objective of the present invention is to substantially cover a communication device 200 with a transparent shield 116 from above the communication device, so as to protect the communication device 200 from moisture, wind, and debris.

Another objective is to enable one-handed manipulation of the communication device 200 while attached to the apparatus 100.

Another objective is to provide a clear view of the display screen for the communication device 200 while attached to the apparatus 100.

Yet another objective is to securely mount the communication device 200 to the side of a vehicle.

Yet another objective is to benefit camera users that have high quality cameras and video cameras. Thus, the main use for the communication device weather shield and vehicle door mount apparatus 100 is to protect devices with touch screen capabilities.

Yet another objective is to provide an inexpensive to manufacture communication device weather shield and vehicle door mount apparatus 100.

Those skilled in the art will recognize that portable electronic devices, such as personal electronic devices, personal data assistants, computers, MP3 players, music players, video players, smart phones, GPS receivers, telematic devices, cell phones, satellite phones, pagers, monitors, walkie-talkies, bar code readers, computers, as well as various hybrid devices that combine two or more of these functions, etc. are being very widely used.

Outdoor or industrial environments impose harsh conditions that typical portable electronic devices are not designed to accommodate. For example, damage can be done to the portable electronic device by rain, extreme sunlight, and strong winds. Furthermore, rough handling and dropping can damage the portable electronic device. Further, industrial chemicals, grease, water, dirt, and grime may damage or destroy a functioning portable electronic device and inhibit the use of the portable electronic devices valuable data. It is common to hold the portable electronic devices inside a protective case for transport. These protective cases do not, however, allow a user to operate the portable electronic device while it is being protected. Also, the cases are not mountable to a surface, such as a vehicle door. The present disclosure helps solve these problems.

Figure 2:
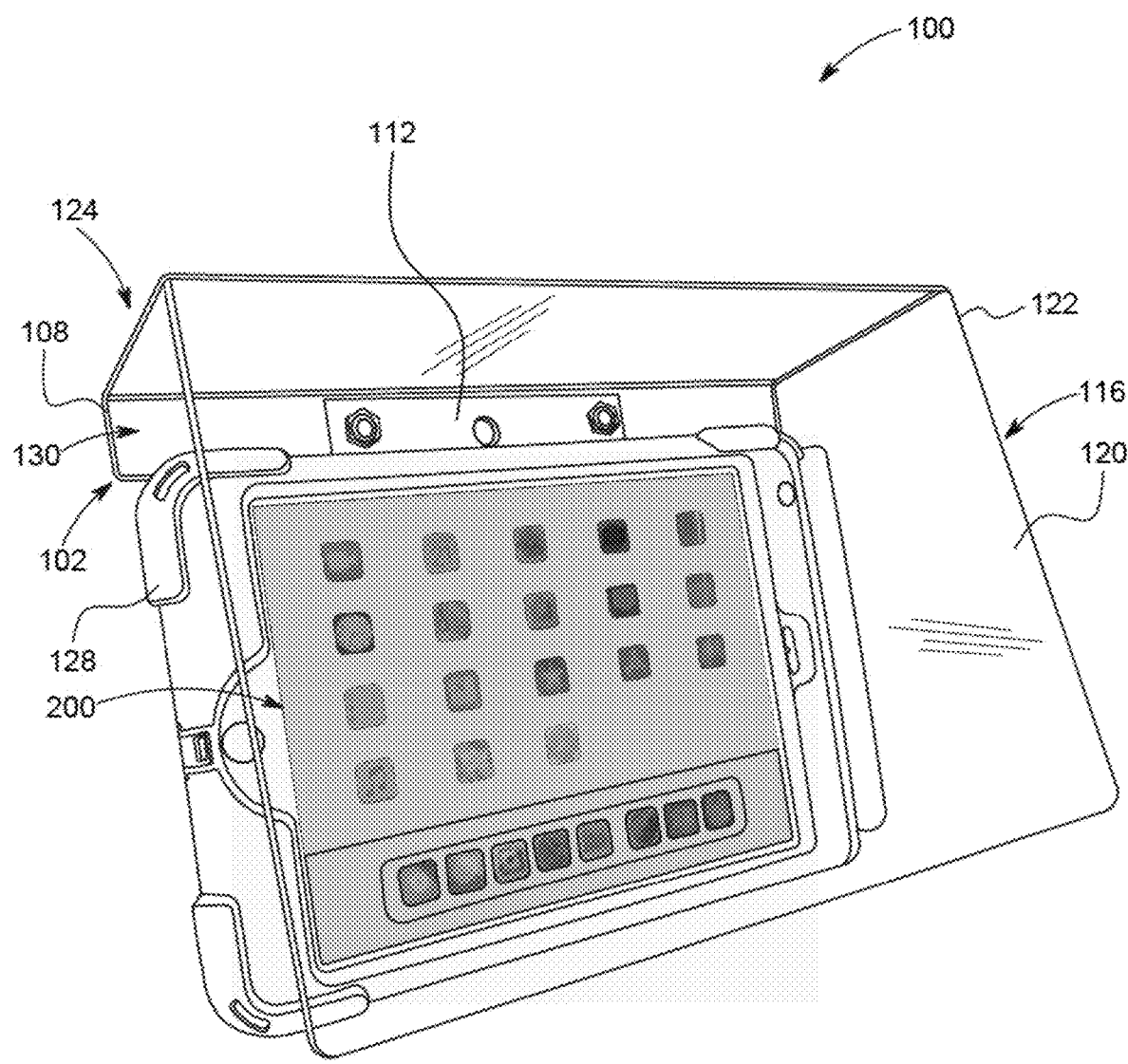
FIG. 2 illustrates a front perspective view of an exemplary communication device mounted to the apparatus, showing the display screen visible through the transparent shield, in accordance with an embodiment of the present invention.

As FIG. 2 references, the apparatus 100 comprises an elongated anchor panel 102 defined by a panel first side 104, a panel second side 106, and a panel edge 108. The anchor panel 102 provides the structure to mount and manipulate the communication device 200. The panel first side 104 comprises an anchoring mechanism 110 that is configured to detachably mount the communication device 200 to the anchor panel 102, such that the communication device 200 is securely, but detachably held parallel and in engagement with the anchor panel 102.

In some embodiments, the anchoring mechanism 110 may include a T-bar 112 that fixedly fastens to the panel first side 104 of the anchor panel 102. The T-bar 112 may include a strip of hook and loop fastener material 126. Though in other embodiments, the anchoring mechanism 110 may include other anchoring means known in the art, including: a magnet, a bracket, a strap, a screw, a hook and loop fastener, and an adhesive.

Figure 3:
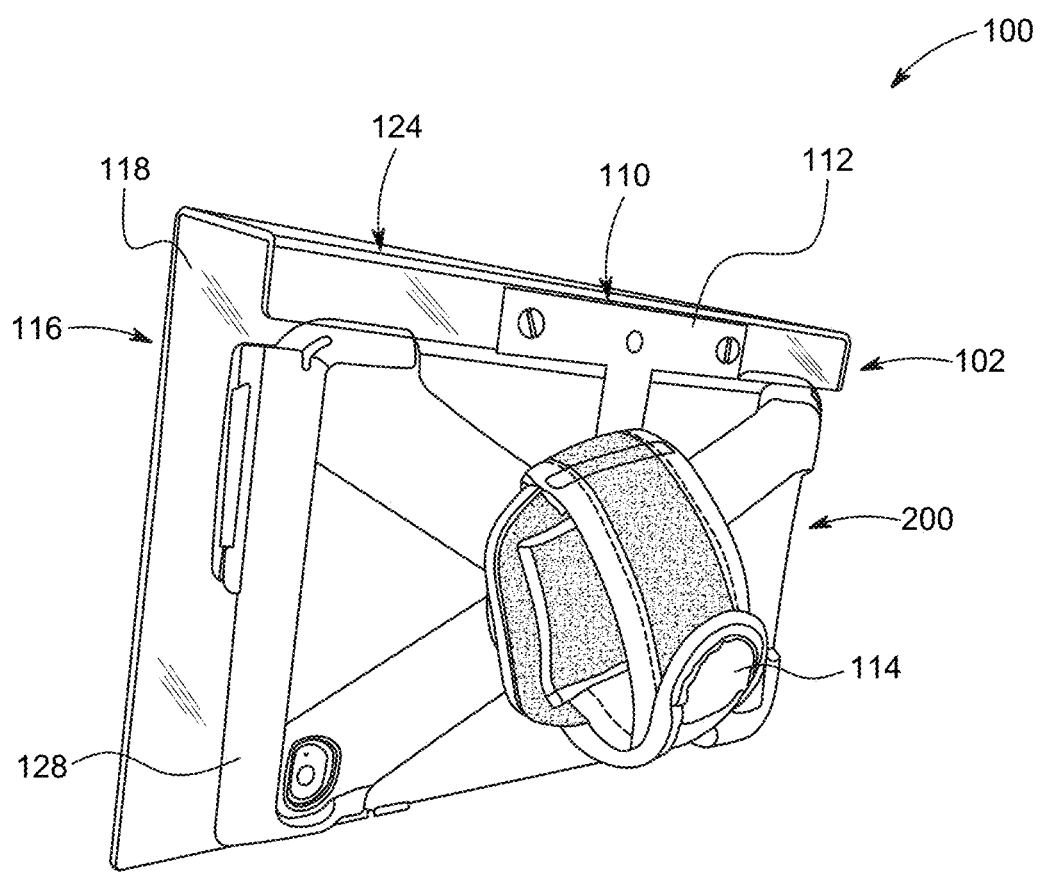
FIG. 3 illustrates a rear perspective view of an exemplary communication device mounted to the apparatus, showing the rear of the communication device and the hand grip and anchoring mechanism on the anchor panel, in accordance with an embodiment of the present invention.

In one non-limiting embodiment shown in FIG. 3, the panel first side 104 of the anchor panel 102 comprises a hand grip 114 that is operable to enable manipulation of the apparatus 100. The hand grip 114 may be attached to a back cover 128, wherein the back cover 128 securely holds the communication device 200 in position. Further, the hand grip 114 may also attach to the anchoring mechanism 110, or the T-bar 112. In some embodiments, the hand grip 114 may include a strap, a strip of hook and loop fastening 126 material, or a U-shaped handle that is sized to receive a hand.

The hand grip 114 may also be size adjustable to accommodate variously sized hands. In this manner, the hand can grasp, turn, extend, and retract the anchor panel 102, and attached communication device 200 for enhanced viewing and operation thereof. When not in use, or when the apparatus is used in a resting position that does not require hand-help operation, the hand grip 114 is detachable from the anchor panel 102.

As illustrated back in FIG. 1, the anchor panel 102 has a generally rectangular shape. Though in other embodiments, the anchor panel 102 may follow other shapes, including a square, a circle, a triangle, and an irregular shape. The anchor panel 102 may also be transparent and constructed from a rigid polymer, such as, but not limited to, polyethylene, polyurethane, polyvinyl chloride, glass, and rubber.

Figure 4:
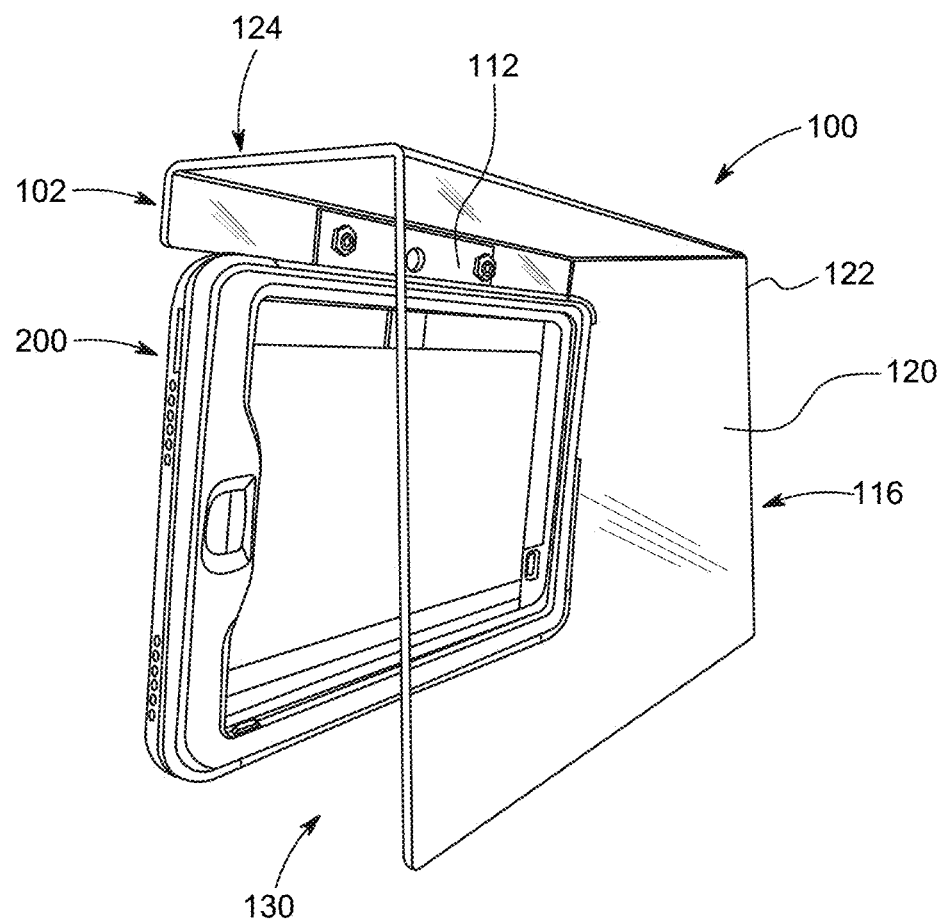
FIG. 4 illustrates a side perspective view of an exemplary communication device mounted to the apparatus, showing the display screen visible through the transparent shield, in accordance with an embodiment of the present invention.

Turning now to FIG. 4, the apparatus 100 further comprises a transparent shield 116 defined by a shield first side 118, a shield second side 120, a shield edge 122, and a generally flat, planar configuration, wherein the transparent shield 116 being disposed in a parallel, spaced-apart relationship with the anchor panel 102, the transparent shield 116 being dimensioned generally larger than the anchor panel 102, whereby the transparent shield 116 substantially covers the anchor panel 102; and an elongated bridge portion 124 so as to extend the full longitudinal length of the anchor panel 102 and the transparent shield 116, wherein the elongated bridge portion 124 connects the edges 108 and 122 of the anchor panel 102 and the transparent shield 116. Thus, in one embodiment, the attached anchor panel 102, transparent shield 116, and bridge portion 124 form a generally form a "U-shaped" elongated cavity 130, whereby the communication device 200 is positioned in the "U-shaped" elongated cavity 130 facing the shield first side 118 of the transparent shield 116, thereby allowing user to operate the communication device 200 while it is simultaneously being protected by the transparent shield 116. Further the transparent shield 116 being larger than, and covering both the anchor panel 102 and bridge portion 124 when held in an upright position.

In one embodiment, the transparent shield 116 has a generally rectangular shape. Though in other embodiments, other shapes may be used, including a square, a circle, a triangle, and an irregular shape. Suitable materials for the transparent shield 116 may include, without limitation, polyethylene, polyurethane, polyvinyl chloride, and glass.

Figure 5:
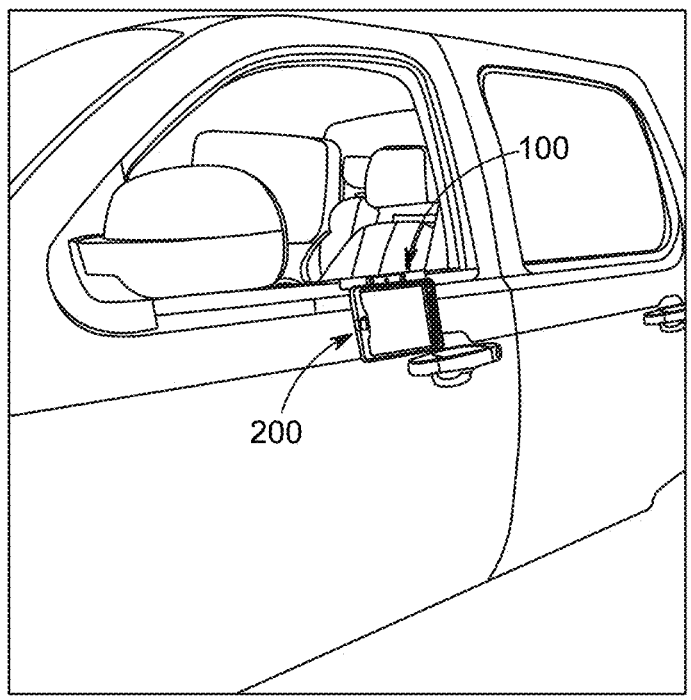
FIG. 5 illustrates a perspective view of the communication device mounted to a vehicle through the apparatus, in accordance with an embodiment of the present invention.

In another embodiment, the transparent shield 116 provides the dual purpose of covering the mounted communication device 200, while enabling a clear view of the display screen thereof; and mounting the apparatus 100 and mounted communication device 200 to a vehicle. The transparent shield 116 is sized and dimensioned to slidably mount in a recess between a vehicle side inner window surface 202 and a vehicle side inner door 204, as shown in FIG. 5. The transparent shield 116 is disposed in a parallel, spaced-apart relationship with the anchor panel 102. The transparent shield 116 is dimensioned generally larger than the anchor panel 102, whereby the transparent shield 116 substantially covers the anchor panel 102; and an elongated bridge portion 124 connecting the edges 108, 122 of the anchor panel 102 and the transparent shield 116, whereby the elongated bridge portion 124 separates the anchor panel 102 from the transparent shield 116 by at least 6 inches.

In one possible embodiment, the transparent shield 116 is sized and dimensioned to substantially cover the anchor panel 102 and communication device 200 when held in front of a user. This strategic positioning of the transparent shield 116 over the mounted communication device 200 helps shield the communication device 200 from rain, sleet, wind, and debris. Consequently, one use of apparatus is to benefit camera users that have high quality cameras and video cameras. Thus, the main use for the communication device weather shield and vehicle door mount apparatus 100 is to protect devices with touch screen capabilities.

Figure 6:
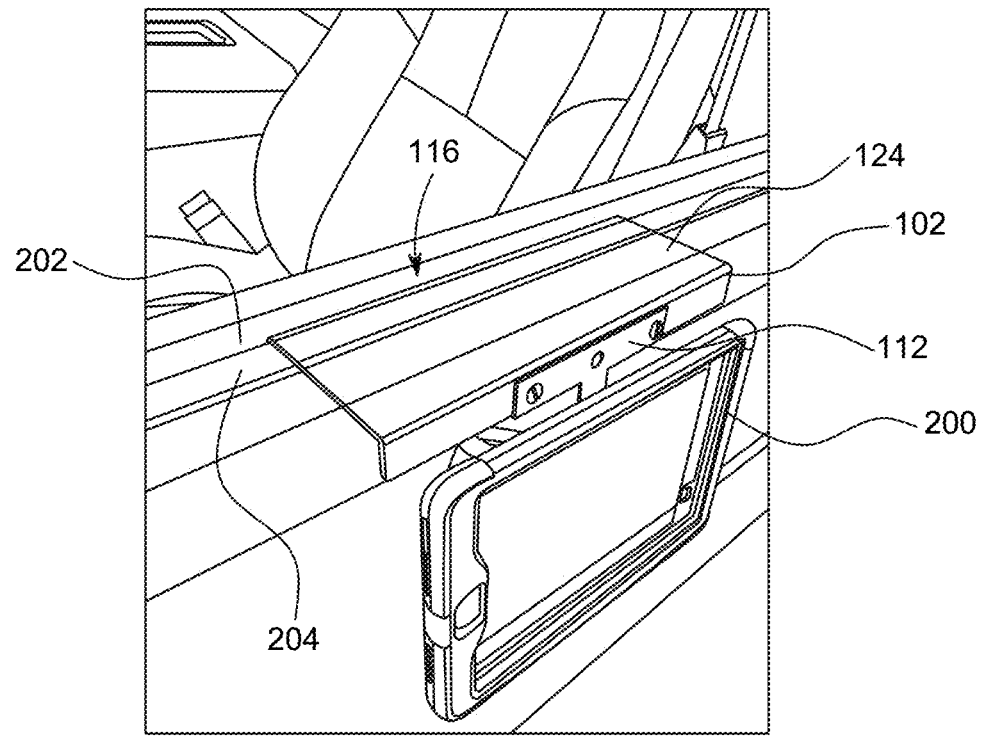
FIG. 6 illustrates a close up view of the communication device mounted to the vehicle, showing the transparent shield sliding in a recess between a vehicle side inner window surface and a vehicle side inner door so that the communication device hangs on the side of the vehicle, in accordance with an embodiment of the present invention.

As discussed above, the transparent shield 116 is also sufficiently flat, so as to slide in a recess between a vehicle side inner window surface 202 and a vehicle side inner door 204. FIG. 6 illustrates a close up view of the communication device 200 mounted to the vehicle, showing the transparent shield 116 sliding in the recess between the vehicle side inner window surface 202 and the vehicle side inner door 204 so that the communication device 200 hangs on the side of the vehicle. From this mounted position, the user may view and operate the communication device 200 directly from the side of the vehicle.

In one non-limiting embodiment, the bridge portion 124 separates the anchor panel 102 from the transparent shield 116 by at least 6 inches. This distance allows the user to operate the communication device 200 while it is simultaneously mounted to the anchor panel 102 and covered by the transparent shield 116.

The bridge portion 124 has a generally rectangular shape. Though in other embodiments, the bridge portion 124 may follow other shapes, including a square, a circle, a triangle, and an irregular shape. The bridge portion 124 may also be transparent and constructed from a rigid polymer, such as, but not limited to, polyethylene, polyurethane, polyvinyl chloride, glass, and rubber.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A communication device protective shield apparatus, wherein the apparatus comprising:
    an elongated anchor panel defined by a panel first side, a panel second side, and a panel edge, the panel first side comprising a T-bar operable to detachably mount a communication device to a vehicle side inner door of a vehicle, the T-bar further comprising a size-adjustable hand grip operable to enable manipulation of the apparatus;

the T-bar having a longitudinal section affixed to the anchor panel, and a transversal section affixed to the communication device;

a transparent shield defined by a shield first side, a shield second side, a shield edge, and a generally flat, planar configuration, wherein the transparent shield being disposed in a parallel, spaced-apart relationship with the anchor panel, the transparent shield being dimensioned generally larger than the anchor panel, whereby the transparent shield substantially covers the anchor panel;

the transparent shield to slide in a recess between a vehicle side inner window surface and the vehicle side inner door, whereby the T-bar and the transparent shield form a clamping effect on the vehicle side inner window surface and the vehicle side inner door, the transparent shield being dimensioned generally larger than the anchor panel, whereby the transparent shield substantially covers the anchor panel and the communication device; and an elongated bridge portion connecting the edges of the anchor panel and the transparent shield to form an elongated cavity, whereby the communication device is positioned in the elongated cavity facing the shield first side of the transparent shield, thereby allowing a user to operate the communication device while it is simultaneously being protected by the transparent shield.

2. The apparatus of claim 1, wherein the anchor panel and the transparent shield have a generally rectangular shape.

3. The apparatus of claim 1, wherein the hand grip is a detachable grip mechanism selected from the group of a strap, or a hook and loop fastener, or a buckle, a magnet or other hand fastening means.

4. The apparatus of claim 3, wherein the anchoring mechanism comprises a strip of hook and loop fastener material attached to the T-bar.

5. The apparatus of claim 1, wherein the communication device includes touch screen devices selected from the following: a tablet, a smart phone, a laptop, a television, personal electronic devices, personal data assistants, computers, MP3 players, music players, video players, smart phones, GPS receivers, telematic devices, cell phones, satellite phones, pagers, monitors, walkie-talkies, bar code readers, computers, and general portable electronic devices.

6. The apparatus of claim 1, wherein the transparent shield helps to protect the communication devices with touch screen capabilities.

7. The apparatus of claim 1, wherein the elongated bridge portion separates the anchor panel from the transparent shield by at least 6 inches to form the "U-shaped" elongated cavity.

8. The apparatus of claim 1, wherein the communication device can be rotatably mounted on the T-bar of the anchoring mechanism, thereby allowing the transparent shield to slidably mount on to a door of a vehicle.

9. The apparatus of claim 1, wherein the hand grip is attached to a back cover of the communication device.

* * * * *